United States Patent Office 3,067,618
Patented Dec. 11, 1962

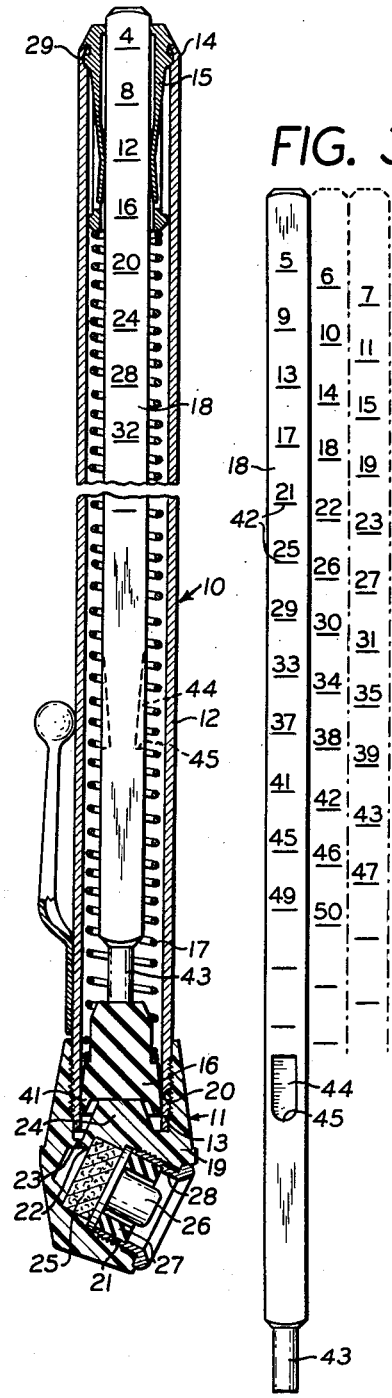

3,067,618
PENCIL TYPE TIRE PRESSURE GAUGE
Joseph Briechle, New Canaan, Conn., assignor to Scovill Manufacturing Company, Waterbury, Conn., a corporation of Connecticut
Filed Aug. 16, 1960, Ser. No. 49,984
4 Claims. (Cl. 73—419)

The present invention relates to pneumatic pressure gauges of the pencil type and aims to provide certain improvements therein.

In gauges of the type specified the force exerted on a piston by a calibrated spring is counter-acted by fluid pressure to be tested and the deflection of the spring is shown by a movable indicating bar, unconnected to the piston but movable thereby outwardly and adapted to remain in indicating position after the fluid pressure acting on the piston has been released. One of the manufacturing problems in constructing a gauge of the type set forth is to obtain springs which will consistently match the calibrations on the indicating bar, since slight variations in the spring, such as in the diameter of the wire, the diameter of the coils and the number of effective coils affect the characteristic of the spring. As a concomitant of these variables, in production, the gauge components must be assembled, tested and disassembled several times before the gauge is found to register the true pressure, a time consuming and costly operation.

An object of the present invention is to provide an accurately registering pressure gauge of the pencil type without recourse to repeated assembling and disassembling operations.

A further object of the invention is to provide a gauge of the character set forth which, when tested and found to be accurate may have the indicating bar mounted in the gauge housing against removal without recourse to upsetting of parts or other time consuming mechanical operations.

A still further object of the invention is to provide a gauge of the character set forth more economically than has been possible in the past.

The foregoing and other objects of the invention, not specifically enumerated, are accomplished by providing two or possibly three groups of indicating bars of regular polygonal cross-section, preferably square, the bars of each group having slightly different calibrations, which indicating bars can be inserted into and removed from a previously assembled gauge housing in a predetermined relation thereto and the indicating bar selected which best responds to the calibrated spring within the assembled housing. Correction for a constant error may be made by forming the inner end of the indicating bar with a part which may be snipped off to compensate for indicating pressure registrations which are too high. When the proper indicating bar and final correction has been made, the selected indicating bar is removed from the housing, rotated a predetermined degree and reinserted into the housing in which new relation in the assembled housing, the indicating bar becomes locked against removal. The invention, including the novel relationship of parts whereby the foregoing objects are accomplished, will be better understood from the detailed description which follows when considered in connection with the accompanying drawing wherein:

FIG. 1 is a longitudinal section through a pressure gauge embodying the invention, the indicating bar being shown in elevation;

FIG. 2 is a top plan view of the gauge shown in FIG. 1;

FIG. 3 is a side elevation of the indicating bar shown in FIG. 1, as viewed from the right hand side thereof and illustrating in phantom development the other two faces of the indicating bar;

FIG. 4 is an elevation of a sleeve forming part of the invention;

FIG. 5 is a section taken along the line 5—5 of FIG. 4; and

FIG. 6 is a top plan view of the sleeve shown in FIG. 4.

Referring to the drawing, in the various figures of which the same reference characters are employed to designate corresponding parts, the numeral 10 indicates a gauge housing assembly consisting of a foot portion 11, a tubular casing 12 secured at its inner end 13 to the foot portion and open at its outer end 14, a tubular sleeve 15 held in swivel relation to the tubular casing at the open end thereof, a piston 16 movable in said casing and a helical spring 17 biasing said piston toward the inner end of the casing. In combination with the gauge housing assembly is an indicating bar 18 movable by but unconnected to said piston 16 and projectable through the outer end of the tubular sleeve 15.

The foot portion 11 may be of any preferred construction and as herein shown consists of a moulded member 19 formed of synthetic resin formed with angularly disposed sockets 20 and 21 having a barrier 22 therebetween provided with a passage 23 for estab'ishing fluid communication between the sockets 20 and 21. Extending into the socket 20 from the barrier 22 is a re-entrant projection 24 which provides a stop for the piston 16. The socket 21 is formed with various diameters, in the smallest of which is disposed an air filter 25 which is held in place by a deflator 26 which in turn is held in mounted relation within the socket by an elastic washer 27 and a bushing 28, the latter being formed with external annular saw-toothed ribs which are force fitted into the socket 21.

The tubular casing 12 may be formed of any suitable material, preferably brass, and at its inner end is externally formed with annular saw-toothed ribs which are force fitted into the socket 20. At its outer end the bore of the casing 12 is enlarged to provide a relatively thin lip 29 which is spun into an annular groove in the tubular sleeve 15 to swivel the latter with respect to the tubular casing.

The tubular sleeve 15 is preferably formed of brass and has a uniform internal diameter 30 which is partially closed at its outer end by an internal flange 31 which is centrally broached to provide a substantially square opening 32 having chamfered corners 33. Externally, the tubular sleeve 15 at its outer end is formed with a peripheral enlargement 34 having a conical surface 35 and an annular groove 36 into which the lip 29 on the casing 12 is inturned to provide the swivel connection between the tubular sleeve and the casing as hereinbefore mentioned. At its inner end the tubular sleeve is formed with an external flange 37 and the external diameter of the sleeve tapers inwardly from the enlargement 34 to the inner end to provide a progressively thinner wall for the sleeve from its outer to its inner end. The tubular sleeve 15, at substantially diametrically opposite longitudinal portions thereof is formed with U-shaped slits 38 to provide tongues 39 which are then bent radially inwardly at their free ends to provide springs for frictionally engaging opposite faces of the indicating bar 18 to hold said bar in pressure indicating position after fluid pressure acting on said bar has been withdrawn. For indicating the location of the spring tongues 39 exteriorly of the gauge housing assembly, punch marks 40 are indented in the conical surface 35 in longitudinal alignment with the tongues.

The piston 16 is preferably formed of rubber and has a tapered skirt portion 41 to insure fluid tight engagement with the bore of the tubular casing 12.

The indicating bar 18 has a cross-sectional contour corresponding to the broached opening 32 in the tubular sleeve 15 for slidable but non-rotative movement therein and each face of the bar has thereon equally spaced pressure indicia markings 42. At its inner end, the indicating bar is formed with an extension 43 of smaller cross section than the bar 18 for a purpose which will presently appear. Inwardly of the terminal indicia on the indicating bar, each of a pair of opposite faces thereof has formed therein a longitudinal recess 44 providing an internal shoulder 45 facing the outer end of the bar. Preferably two or three groups of indicating bars are provided, the bars of each group having slightly different equally spaced calibrations for a purpose which will presently appear.

From the foregoing detailed description it will be apparent that an indicating bar can be inserted into and removed from a previously assembled gauge housing when the bar is inserted into said housing through the sleeve in such relation that the faces of the bar provided with the longitudinal recesses 44 are out of phase with the spring tongues on the tubular sleeve, and that when the indicating bar is inserted into the tubular sleeve with the longitudinal recesses 44 on the bar in phase with the spring tongues, as indicated by the punch marks 40, the indicating bar after insertion cannot be withdrawn due to the engagement of the ends of the spring tongues with the internal shoulders 45. The ability of the indicating bar to be inserted and removed from a pre-assembled gauge housing greatly facilitates the testing and completion of the assembly of the gauges.

In the manufacture, assembly and testing of pressure gauges made in accordance with the present invention, the housing assemblies each consisting of foot portion 11, tubular casing 12, tubular sleeve 15, piston 16 and spring 17 are first non-removably assembled. In such preassembled gauge housing a first of the group of indicating bars is inserted in its removable relation to the tubular sleeve and the gauge subjected to known test pressures and readings of the gauge taken. If the gauge indicates true readings of the pressure, the indicating bar is withdrawn, rotated 90° and re-inserted into the housing wherein it will be then confined against withdrawal. If the gauge does not indicate true readings, the gauge bar is removed and an indicating bar of one of the other groups inserted depending upon whether the indicated readings on the first bar were too high or too low. A substituted indicating bar when found satisfactory can then be non-removably inserted into the gauge housing. Correction for a constant too high reading of an indicating bar can be made by snipping off a portion of the extension 43 of the indicating bar.

From the foregoing detailed description it will be apparent that a substantial saving in time is realized in the gauge testing operation and the need for resorting to a final assembly operation after testing by recourse to upsetting of parts or other mechanical means eliminated.

Although there has been shown and described a preferred embodiment of the invention, it is to be understood that changes in details of construction may be resorted to within the range of engineering and mechanical skill without departing from the spirit of the invention as hereinafter claimed.

What I claim is:

1. A fluid pressure gauge having a pre-assembled housing assembly comprising a foot portion, a tubular casing secured at its inner end to the foot portion and open at its outer end, a tubular sleeve held in swivel relation to the casing in the open end thereof and having an opening of regular polygonal form, a piston movable in said casing and a helical coil spring biasing said piston toward the inner end of the casing, in combination with an indicating bar of regular polygonal cross-section corresponding to the polygonal form of the opening in the sleeve movable by but unconnected to said piston and projectable through the outer end of the sleeve, said indicating bar being formed in at least one face thereof, longitudinally inward of the pressure calibrations thereon, with an undercut shoulder facing the outer end of the indicating bar, said tubular sleeve being formed with at least one longitudinally extending spring tongue frictionally engaging a face of the indicating bar and adapted to engage the shoulder thereon, whereby in at least one position of the indicating bar relative to the spring tongue on the sleeve the indicating bar can be inserted into and removed from the housing through the open top thereof, and in another position of the indicating bar relative to the spring tongue on the sleeve the spring tongue will be disposed to engage a face of the indicating bar provided with the shoulder, so that when the indicating bar is in said last recited relation, it will be confined against removal from the housing assembly by the engagement of the spring tongue with the shoulder.

2. A fluid pressure gauge according to claim 1, wherein the longitudinally extending spring tongue is integral with the sleeve and consists of a slitted portion of the sleeve which is deformed to extend inwardly of the sleeve.

3. A pressure gauge according to claim 1, wherein the indicating bar is of substantially square cross-section and has an internal shoulder formed in each of two opposite faces, and the tubular sleeve has a pair of diametrically opposed spring tongues, which when in engagement with the unshouldered faces of the indicating bar permit insertion into and removal of the indicating bar from the housing assembly and when said tongues are in engagement with the shouldered faces of the indicating bar permit insertion of the indicating bar into but prevent removal thereof from the housing assembly.

4. A pressure gauge according to claim 1, wherein the outer end of the tubular sleeve extends beyond the open top of the tubular casing and means indicating the location of the tongues in said sleeve.

References Cited in the file of this patent

UNITED STATES PATENTS

| | | |
|---|---|---|
| 1,742,740 | Watters | Jan. 7, 1930 |
| 1,998,420 | Carliss | Apr. 16, 1935 |
| 2,049,532 | Williams | Aug. 4, 1936 |
| 2,924,100 | Price | Feb. 9, 1960 |